United States Patent
Thor et al.

(10) Patent No.: US 11,171,584 B1
(45) Date of Patent: Nov. 9, 2021

(54) INTERPOLATION CIRCUIT AND MOTOR DRIVING CIRCUIT

(71) Applicant: PixArt Imaging Inc., Hsin-Chu (TW)

(72) Inventors: Swee Lin Thor, Penang (MY); Gim Eng Chew, Penang (MY)

(73) Assignee: Pix Art Imaging Inc., Hsin-Chu (TW)

( * ) Notice: Subject to any disclaimer, the term of this patent is extended or adjusted under 35 U.S.C. 154(b) by 2 days.

(21) Appl. No.: 16/871,071

(22) Filed: May 11, 2020

(51) Int. Cl.
*H02P 6/15* (2016.01)

(52) U.S. Cl.
CPC .................... *H02P 6/153* (2016.02)

(58) Field of Classification Search
CPC ....................................... H02P 6/153
USPC ................. 318/400.14, 400.13, 400.01, 700
See application file for complete search history.

(56) References Cited

U.S. PATENT DOCUMENTS 7,027,466 B1\* 4/2006 Ozeki ..................... H04J 14/08
370/527

\* cited by examiner

*Primary Examiner* — David Luo
(74) *Attorney, Agent, or Firm* — Winston Hsu

(57) ABSTRACT

An interpolation circuit comprising: a phase shift circuit, configured to generate a plurality of phase shift signals; a first multiplexer configured to receive at least portion of the phase shift signals; a first comparator, comprising a first positive input terminal and a first negative input terminal; a second comparator, comprising a second positive input terminal and a second negative input terminal; a first state control circuit, configured to control the first multiplexer to switch to a different state according to a first comparing result and a second comparing result, wherein the first multiplexer outputs different ones of the phase shift signals in different states; and a first voltage level compensating circuit, configured to pull up or pull down a first output signal from the first output terminal or a second output signal from the second output terminal when the state of the first multiplexer changes.

19 Claims, 7 Drawing Sheets

| Comparator C1 | | |
|---|---|---|
| + | − | SW |
| sin0 | sin180 | YA0 |
| sin7.2 | sin187.2 | YA2 |
| sin14.4 | sin194.4 | YA4 |
| sin21.6 | sin201.6 | YA6 |
| sin28.8 | sin208.8 | YA8 |

| Comparator C2 | | |
|---|---|---|
| + | − | SW |
| sin3.6 | sin183.6 | YA1 |
| sin10.8 | sin190.8 | YA3 |
| sin18.0 | sin198 | YA5 |
| sin25.2 | sin205.2 | YA7 |
| sin32.4 | sin212.4 | YA9 |

| Comparator C3 | | |
|---|---|---|
| + | − | SW |
| sin1.8 | sin181.8 | YB0 |
| sin9.0 | sin189.0 | YB2 |
| sin16.2 | sin196.2 | YB4 |
| sin23.4 | sin203.4 | YB6 |
| sin30.6 | sin210.6 | YB8 |

| Comparator C4 | | |
|---|---|---|
| + | − | SW |
| sin5.4 | sin185.4 | YB1 |
| sin12.6 | sin192.6 | YB3 |
| sin19.8 | sin199.8 | YB5 |
| sin27.0 | sin207.0 | YB7 |
| sin34.2 | sin214.2 | YB9 |

FIG. 3

INTERPOLATION CIRCUIT AND MOTOR DRIVING CIRCUIT

BACKGROUND OF THE INVENTION

1. Field of the Invention

The present invention relates to an interpolation circuit and a motor driving circuit, and particularly relates to an interpolation circuit and a motor driving circuit can improve a hysteresis issue.

2. Description of the Prior Art

A conventional interpolation circuit for a motor always comprises a multiplexer and a comparator. The multiplexer is configured to select different input signals for the comparator. Also, the comparator compares the input signals and triggers based on signal values of the input signals received at different receiving terminals. The comparator may have hysteresis to in order to have a higher immunity to noise. However, the hysteresis may cause some problems.

FIG. 1 is a schematic diagram illustrating a conventional hysteresis issue. In FIG. 1, the output signal OS is an output signal of an ideal comparator which has no hysteresis, and the input signals IN_1, IN_2 are input to different receiving terminals of the comparator. The logic value of the output signal OS transits at the time t1 and the time t2, at which the signal values of the input signals IN_1, IN_2 becomes equal. However, due to hysteresis, the logic values of an output signal OS' of a practical comparator transit at the time t1' and the time t2', which respectively falls behind the time t1 and the time t2 for a delay time D.

Such delay may affect the accuracy of comparing results of the comparator.

SUMMARY OF THE INVENTION

Therefore, one objective of the present invention is to provide an interpolation circuit which can improve the hysteresis issue of the comparator.

Another objective of the present invention is to provide a motor control circuit which can improve the hysteresis issue of the comparator.

One embodiment of the present invention discloses an interpolation circuit comprising: a phase shift circuit, configured to receive at least one input signal to generate a plurality of phase shift signals of the input signal; a first multiplexer configured to receive at least portion of the phase shift signals; a first comparator, comprising a first positive input terminal and a first negative input terminal to receive the phase shift signals output by the first multiplexer; a second comparator, comprising a second positive input terminal and a second negative input terminal to receive the phase shift signals output by the first multiplexer, wherein the first comparator and the second comparator do not receive identical ones of the phase shift signals simultaneously; a first state control circuit, configured to control the first multiplexer to switch to a different state according to a first comparing result of the phase shift signals received by the first positive input terminal and the first negative input terminal and a second comparing result of the phase shift signals received by the second positive input terminal and the second negative input terminal, wherein the first multiplexer outputs different ones of the phase shift signals in different states; and a first voltage level compensating circuit, coupled to a first output terminal of the first comparator and a second output terminal of the second comparator, to pull up a first output signal from the first output terminal or a second output signal from the second output terminal when the state of the first multiplexer changes, or to pull down the first output signal or the second output signal when the state of the first multiplexer changes.

Another embodiment of the present invention discloses a motor driving circuit comprising an interpolation circuit and a first clock generating circuit. The interpolation circuit comprises: a phase shift circuit, configured to receive at least one input signal to generate a plurality of phase shift signals of the input signal; a first multiplexer, configured to receive at least portion of the phase shift signals; a first comparator, comprising a first positive input terminal and a first negative input terminal to receive the phase shift signals output by the first multiplexer; a second comparator, comprising a second positive input terminal and a second negative input terminal to receive the phase shift signals output by the first multiplexer, wherein the first comparator and the second comparator do not receive identical ones of the phase shift signals simultaneously; a first state control circuit, configured to control the first multiplexer to switch to a different state according to a first comparing result of the phase shift signals received by the first positive input terminal and the first negative input terminal and a second comparing result of the phase shift signals received by the second positive input terminal and the second negative input terminal, wherein the first multiplexer outputs different ones of the phase shift signals in different states; and a first voltage level compensating circuit, coupled to a first output terminal of the first comparator and a second output terminal of the second comparator, to pull up a first output signal from the first output terminal or a second output signal from the second output terminal when the state of the first multiplexer changes, or to pull down the first output signal or the second output signal when the state of the first multiplexer changes. The first clock generating circuit is configured to generate a first clock signal according to the first output signal and the second output signal. The first voltage level compensating circuit further generates a first motor control signal according to the first output signal, the second output signal and the first clock signal.

In view of above-mentioned embodiments, the output of the comparator can be compensated to improve the hysteresis issue of the comparator, thus the comparing result of the comparator can be more accurate.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is an example of the phase shift signals received by different comparators in different states.

DETAILED DESCRIPTION

Several embodiments are provided in following descriptions to explain the concept of the present invention. Each component in following descriptions can be implemented by hardware (e.g. a device or a circuit) or hardware with software (e.g. a program installed to a processor). Besides, the term "first", "second", "third" in following descriptions are only for the purpose of distinguishing different one elements, and do not mean the sequence of the elements. For example, a first device and a second device only mean these devices can have the same structure but are different devices.

Figure 1:
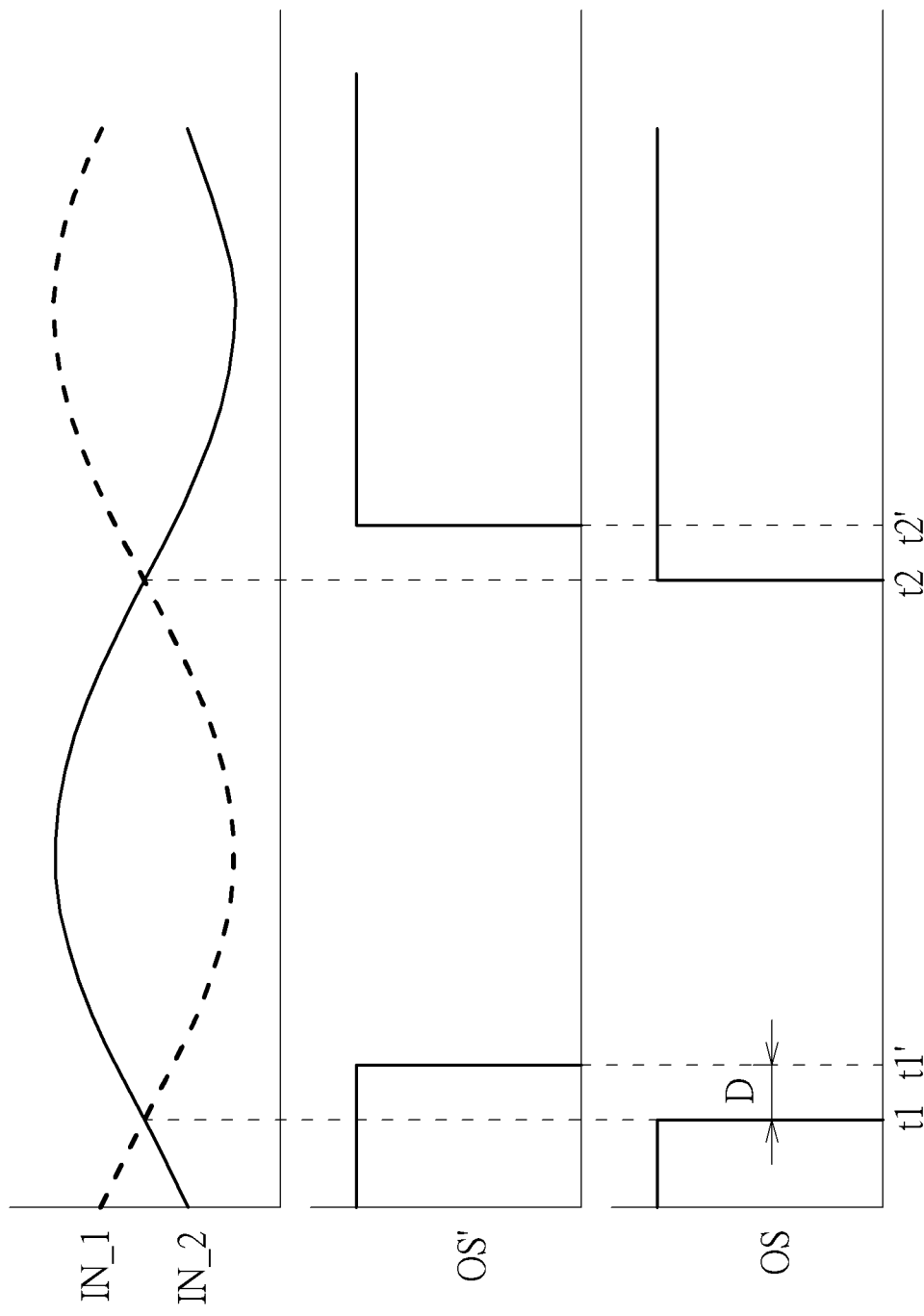
FIG. 1 is a schematic diagram illustrating a conventional hysteresis issue.
Figure 2:
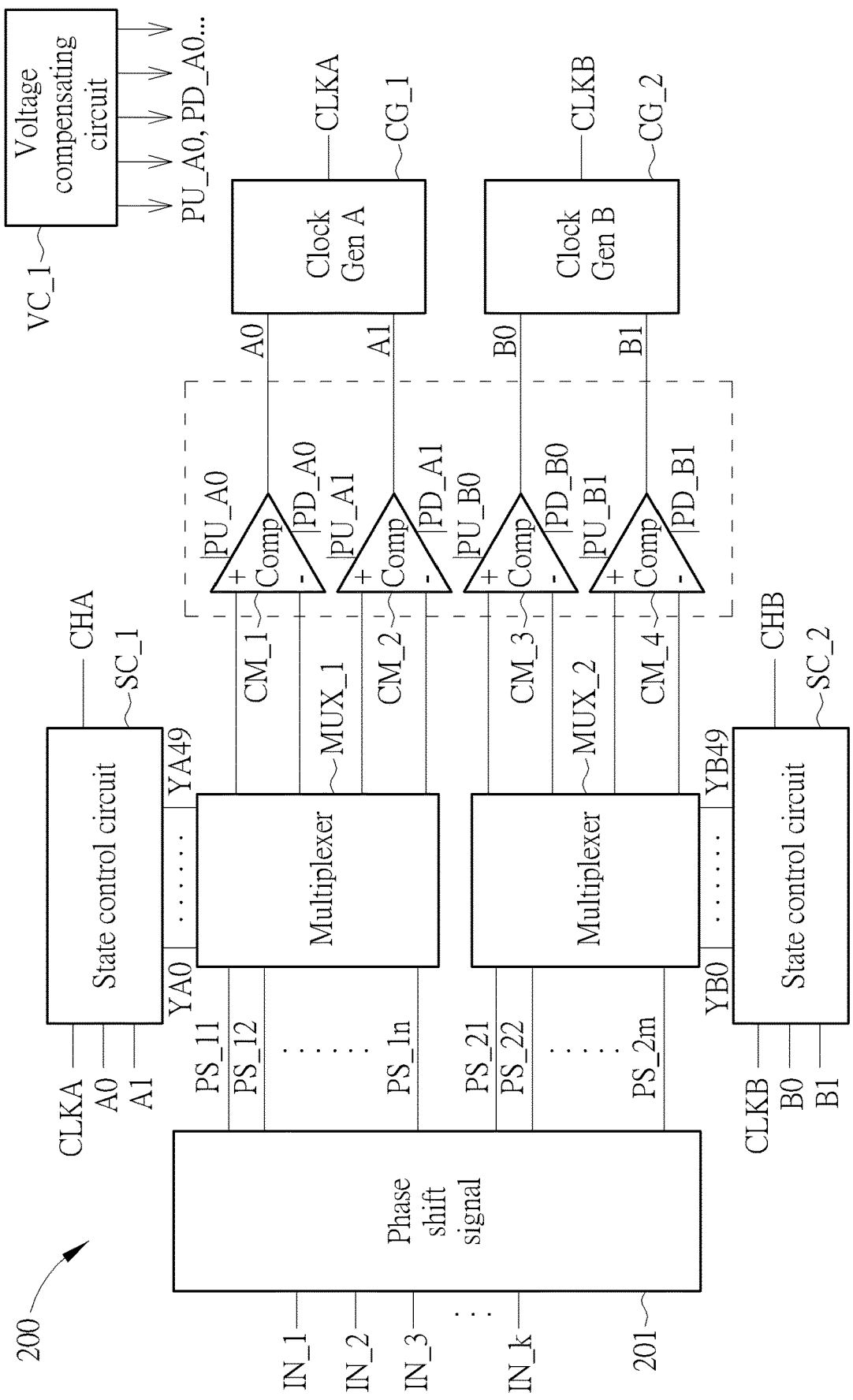
FIG. 2 is a block diagram illustrating an interpolation circuit according to one embodiment of the present invention.

FIG. 2 is a block diagram illustrating an interpolation circuit 200 according to one embodiment of the present invention. As illustrated in FIG. 2, the interpolation circuit 200 comprises a phase shift circuit 201, a first multiplexer MUX_1, a second multiplexer MUX_2, a first state control circuit SC_1, a second state control circuit SC_2, a first comparator CM_1, a second comparator CM_2, a third comparator CM_3, a fourth comparator CM_4 and a first voltage compensating circuit VC_1. In one embodiment, the interpolation circuit 200 can further comprise a second voltage compensating circuit for the second multiplexer MUX_2, the second state control circuit SC_2, the third comparator CM_3 and the fourth comparator CM_4. The second voltage compensating circuit can be a circuit independent from the first voltage compensating circuit VC_1 or be integrated to the first voltage compensating circuit VC_1.

The phase shift circuit 201 is configured to receive at least one input signal IN_1 . . . IN_k to generate a plurality of phase shift signals PS_11-PS_1$n$, PS_21-PS_2$n$ of the input signal IN_1 . . . IN_k. The first multiplexer Mux_1 is configured to receive at least portion of the phase shift signals PS_11-PS_1$n$, PS_21-PS_2$n$. The first comparator CM_1, which comprises a first positive input terminal and a first negative input terminal, is configured to receive the phase shift signals output by the first multiplexer MUX_1. The second comparator CM_2, which comprises a second positive input terminal and a second negative input terminal, is configured to receive the phase shift signals PS_11-PS_1$n$ output by the first multiplexer MUX_1. The first state control circuit SC_1 is configured to control the first multiplexer MUX_1 to switch to a different state according to a first comparing result of the phase shift signals received by the first positive input terminal and the first negative input terminal and a second comparing result of the phase shift signals received by the second positive input terminal and the second negative input terminal. The first comparator CM_1 and the second comparator CM_2 do not receive identical ones of the phase shift signals simultaneously.

The first multiplexer MUX_1 outputs different ones of the phase shift signals in different states. The first voltage level compensating circuit VC_1 is coupled to a first output terminal of the first comparator CM_1 and a second output terminal of the second comparator CM_2, to pull down a first output signal from the first output terminal or a second output signal from the second output terminal when the state of the first multiplexer MUX_1 changes, or to pull down the first output signal or the second output signal when the state of the first multiplexer MUX_1 changes. The first voltage level compensating circuit VC_1 may be configured to compensate hysteresis effect of the first comparator CM_1 and the second comparator CM_2.

In one embodiment, an analog input signal and an inverted signal thereof input to the phase shift signal 201. Also, the phase shift signal 201 generates phase shift signals having different phase shifts from the input signal. In such case, the first multiplexer MUX_1 receives the phase shift signals having sin(2N×1.8°) phase shift from the input signal, and the second multiplexer MUX_2 receives the phase shift signals having sin[(2N+1)×1.8°] phase shift from the input signal. N is 0 or a positive integer. For example, the first multiplexer MUX_1 receives the phase shift signals having phase shifts sin 0°, sin 3.6° . . . sin 356.4° from the input signal, and the second multiplexer MUX_2 receives the phase shift signals having phase shifts sin 1.8°, sin 5.4° . . . sin 358.2° from the input signal. For the convenience of understanding the phase shift signals having sin(2N×1.8°) phase shift from the input signal is named as the signal sin(2N×1.8°), and the phase shift signals having sin[(2N+1)×1.8°] phase shift from the input signal is named as the signal sin[(2N+1)×1.8°]. For example, the signal sin 0° means a phase signal which has sin 0° from the input signal, and the signal sin 5.4° means a phase signal which has sin 5.4° from the input signal.

In following descriptions, the operations of the second multiplexer MUX_2, the second state control circuit SC_2, the third comparator CM_3 and the fourth comparator CM_4 are similar with the operations of the first multiplexer MUX_1, the first state control circuit SC_1, the first comparator CM_1 and the second comparator CM_2, thus some descriptions thereof may be omitted for brevity. Further, in one embodiment, the second state control circuit SC_2, the third comparator CM_3 and the fourth comparator CM_4 and the above-mentioned second voltage level compensating circuit can be omitted from the interpolation circuit 200. The third comparator CM_3 has a third positive input terminal and a third negative input terminal, and the fourth comparator CM_4 has a fourth positive input terminal and a fourth negative input terminal. Also, the third comparator CM_3 outputs a third output signal and the fourth comparator CM_4 outputs a fourth output signal.

As above-mentioned, the first multiplexer MUX_1 outputs different ones of the phase shift signals in different states, which may be switched based on the comparing results of the first comparator CM_1 and the second comparator CM_2 (i.e. based on the first output signal or the second output signal). In one embodiment, such as the embodiment of FIG. 5, the first state control circuit SC_1 controls the first multiplexer MUX_1 to switch to the different state, when a value of the phase shift signal at the first positive input terminal of the first comparator CM_1 is larger than a value of the phase shift signal at the first negative input terminal of the first comparator CM_1, and a value of the phase shift signal at the second positive input terminal of the second comparator CM_2 is larger than a value of the phase shift signal at the second negative input terminal of the second comparator CM_2. Also, in another embodiment, such as the embodiment of FIG. 6, the first state control circuit SC_1 controls the first multiplexer MUX_1 to switch to the different state, when a value of the phase shift signal at the first positive input terminal is smaller than a value of the phase shift signal at the first negative input terminal and a value of the phase shift signal at the second positive input terminal is smaller than a value of the phase shift signal at the second negative input terminal. The embodiments of FIG. 5 and FIG. 6 will be described for more details later.

Figure 4:
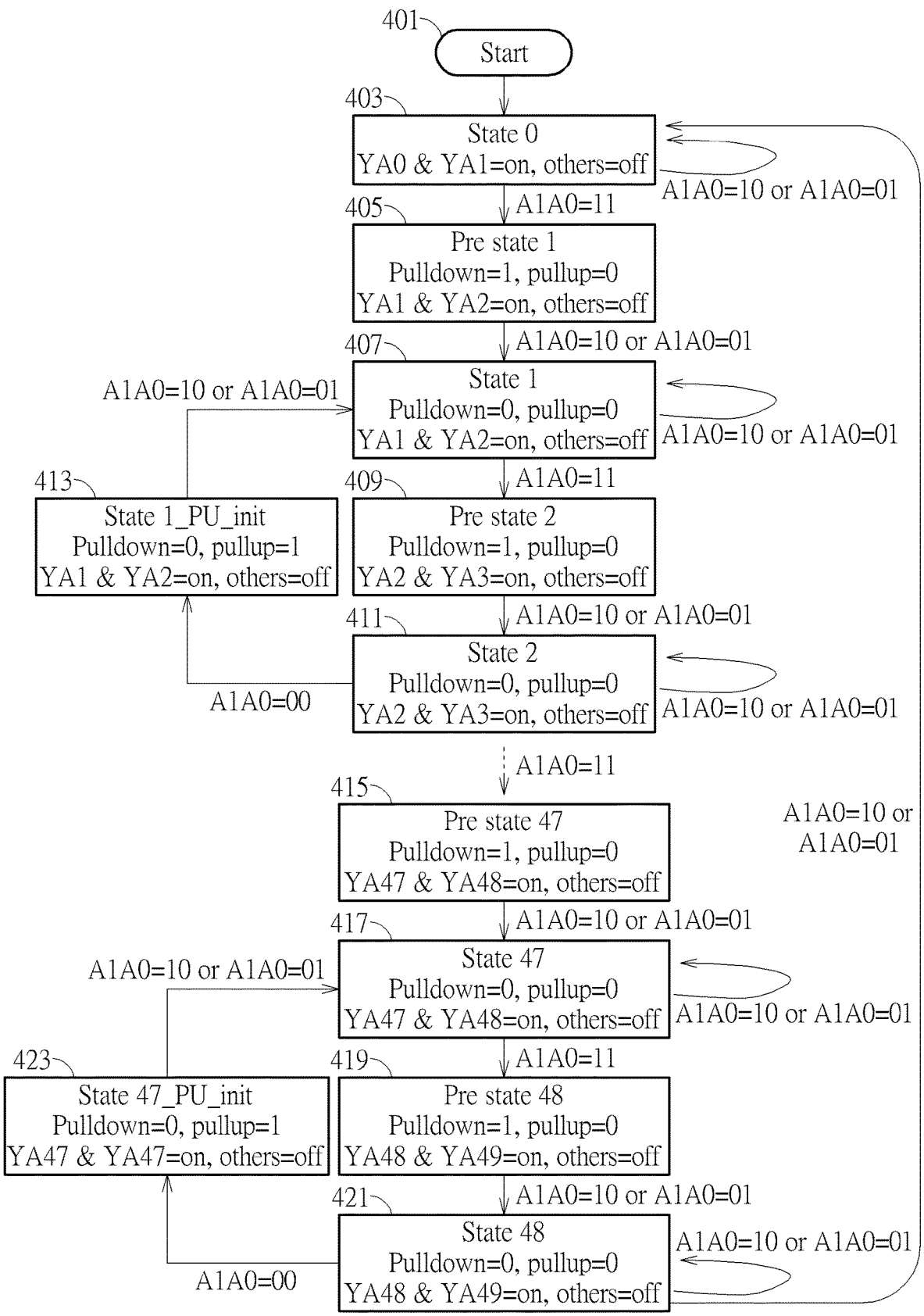
FIG. 4 is a flow chart illustrating the state switch operations of the interpolation circuit in FIG. 2 according to one embodiment of the present invention.
Figure 5:
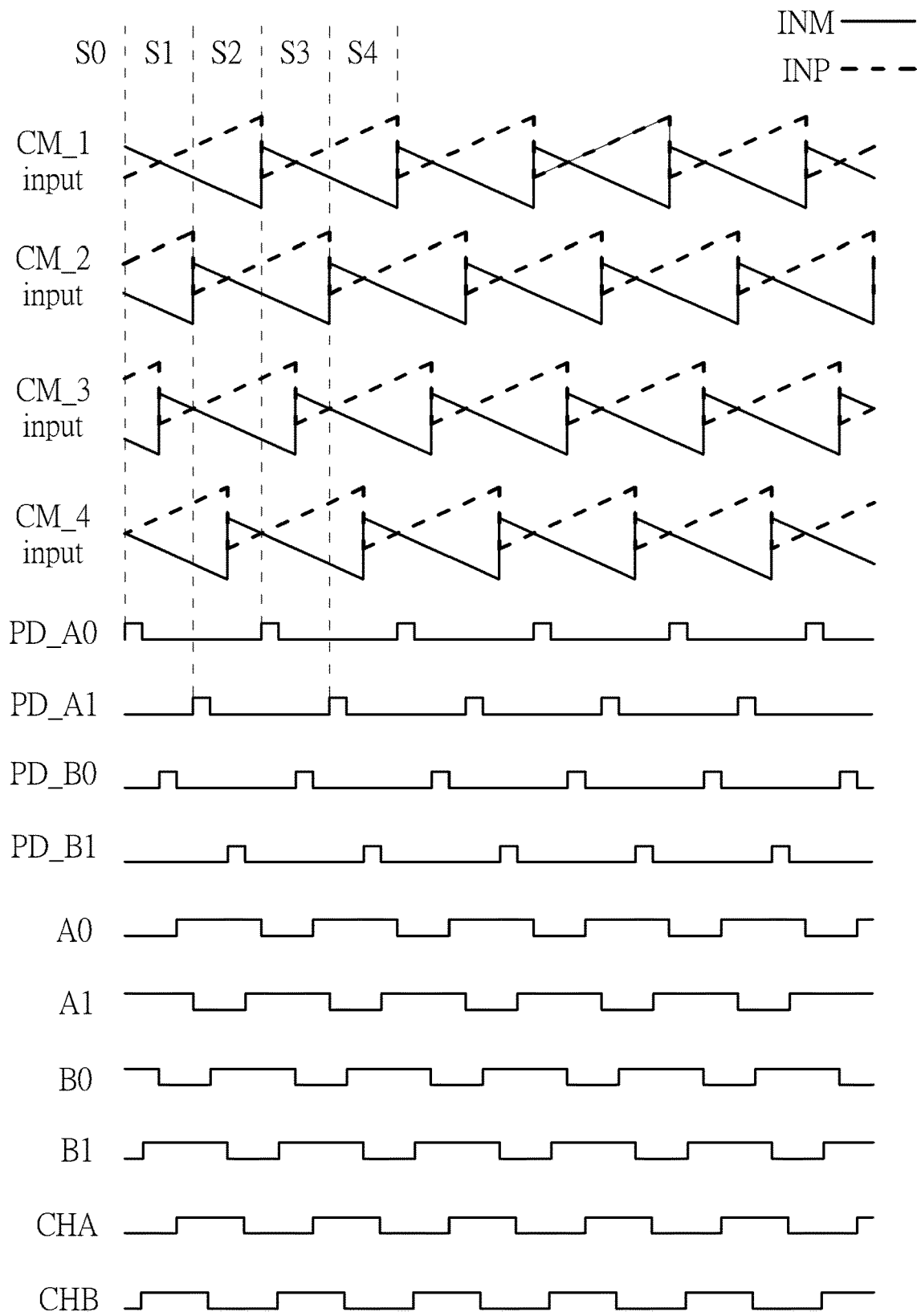
FIG. 5 and FIG. 6 are waveform of the interpolation circuit illustrated in FIG. 2, according to different embodiments of the present invention.

FIG. 4 is a flow chart illustrating the state switch operations of the interpolation circuit in FIG. 2 according to one embodiment of the present invention. Also, FIG. 5 is a waveform of the interpolation circuit illustrated in FIG. 2, according to one embodiment of the present invention. Please refer to FIG. 2, FIG. 4 and FIG. 5 together to understand the concept of the present invention for more clarity.

Please refer to FIG. 2 again. In one embodiment, the interpolation circuit is a 50× interpolation circuit, thus the first state control circuit SC_1 can control 50 paths YA0, YA1, YA2 . . . YA49 of the first multiplexer MUX_1, thus the first comparator CM_1 or second comparator CM_2 receives different phase shift signals in different states. For example, if the paths YA0, YA1 are on in the state 0, the first comparator CM_1 receives the signals sin 0°, sin 180° (YA0), and the second comparator CM_2 receives the signals sin 3.6°, sin 183.6° (YA1). Similarly, the second state control circuit SC_2 can control 50 paths YB0, YB1, YB2 . . . YB49 of the second multiplexer MUX_2, and the third comparator CM_3, fourth comparator CM_4 receive different phase shift signals in different states. For example, if the paths YB0, YB1 are on in the state 0, the third comparator CM_3 receives the phase signals sin 1.8°, sin 181.8° (YB0), and the fourth comparator CM_2 receives the phase signals sin 5.4°, sin 185.4° (YB1).

Further, in the next state (state 1), paths YA0, YB0, are off and the paths YA2, YA1, YB2, YB1 are on. In such case, the first comparator CM_1 receives the signals sin 7.2°, sin 187.2° (YA2), and the second comparator CM_2 still receives the phase signals sin 3.6°, sin 183.6° (YA1). Also, in such case, the third comparator CM_3 receives the signals sin 9.0°, sin 189.0° (YB2), and the fourth comparator CM_2 receives the signals sin 5.4°, sin 185.4° (YB1). FIG. 3 illustrates some examples for the phase shift signals received by the first comparator CM_1, the second comparator CM_2, the third comparator CM_3 and the fourth comparator CM_4 in different states, but do not mean to limit the scope of the present invention.

As above-mentioned, the first control circuit SC_1 can switch the states of the first multiplexer MUX_1 according to the output A0 and the output A1 (i.e. the first comparing result and the second comparing result, or the first output signal and the second output signal) of the first comparator CM_1 and the second comparator CM_2. Also, the voltage compensating circuit VC_1 pulls up or pull downs the output of the first comparator CM_1 or the second comparator CM_2 to improve the hysteresis issue. Detail operations will be describes in following descriptions. In one embodiment, the output of the first comparator CM_1 or the second comparator CM_2 is pulled up to the logic value 1 or pulled down to the logic value 0.

In FIG. 2, the first comparator CM_1 comprises a first positive input terminal for receiving a positive input IMP and comprises a first negative input terminal for receiving a negative input IMM. Also, the second comparator CM_1 comprises a second positive input terminal for receiving a positive input IMP and comprises a second negative input terminal for receiving a negative input IMM. The output A0 of the first comparator CM_1 becomes 1 when a signal value of the positive input INP thereof is larger than a signal value of the negative input INM thereof, and becomes 0 when a signal value of the positive input INP thereof is smaller than a signal value of the negative input INM thereof. Also, output A1 of the second comparator CM_2 becomes 1 when a signal value of the positive input INP thereof is larger than a signal value of the negative input INM thereof, and becomes 0 when a signal value of the positive input INP thereof is smaller than a signal value of the negative input INM thereof.

Therefore, the first comparator CM_1 and the second comparator CM_2 are supposed to start with the state 0 (S0 in FIG. 5, step 403 in FIG. 4), as shown in FIG. 5. In the state 0, the first comparator CM_1 receives the phase shift signal corresponding to the path YA0 and the second comparator CM_2 receives the phase shift signal corresponding to the path YA1. Also, the first multiplexer MUX_1 stays in the same state if the outputs A0, A1 are 10 or 01, and switches to the pull down interval 0 (pre-state 1, step 405 in FIG. 4) if the outputs A0, A1 are 11. In the pull down interval 0, the output of the first comparator CM_1 is pulled down. After that, if the outputs A0, A1 are 10 or 01, the first multiplexer MUX_1 enters the state 1 (S1 in FIG. 5, step 407 in FIG. 4). In the state 1, the first comparator CM_1 receives the phase shift signal corresponding to the path YA2 and the second comparator CM_2 receives the phase shift signal corresponding to the path YA1, as shown in the above-mentioned FIG. 3.

In the state 1, the first multiplexer MUX_1 stays in the same state if the outputs A0, A1 are 10 or 01, and switches to the pull down interval 1 (pre-state 2, step 409 in FIG. 4) if the outputs A0, A1 are 11. In such case, the output of the second comparator CM_2 is pulled down. In the state 1, if the outputs A0, A1 are 10 or 01, the interpolation circuit 200 enters the state 2 (S2 in FIG. 5, step 413 in FIG. 4). In the state 2, the first comparator CM_1 receives the phase shift signal corresponding to the path YA2 and the second comparator CM_2 receives the phase shift signal corresponding to the path YA3, as shown in the above-mentioned FIG. 3.

Further, in the state 2, in which both the inputs of the first comparator CM_1 and the second comparator CM_2 have been changed one time, the first multiplexer MUX_1 stays in the same state if the outputs A0 and A1 are 10 or 01 (step 411 in FIG. 4). Also, the first multiplexer MUX_1 switches to the next state 3 if the outputs A1 and A1 are 11. Further, the output of the first comparator CM_1 or the second comparator CM_2 is pulled up if the outputs A0 and A1 are 00 (step 413 in FIG. 4). Also, the flow goes back to the step 407 if the outputs of the first comparator CM_1 or the second comparator CM_2 is pulled up such that the outputs A0 and A1 are 10 or 01. Such step can prevent the first comparator CM_1 and the second comparator CM_2 from generating wrong outputs due to the pull down operations.

In view of above-mentioned descriptions, the steps 403-411 can be summarized as follows: the first multiplexer MUX_1 switches to a next state if the comparing results (e.g. outputs A0, A1, B0, B1) indicate that signal values of the phase shift signals received by positive terminals of the comparators (e.g. INP) are larger than the signal values of the phase shift signals received by negative terminals of the comparators (e.g. INM). Also, the output of the comparator is pull down when the first multiplexer MUX_1 switches to a next state and the phase shift signals input to the comparator changes. For example, while switching from the state 1 to the state 2, the phase shift signals input to the second comparator CM_2 change from signals corresponding to YA1 to signals corresponding to YA3, thus the output of the second comparator CM_2 is pulled down while switching from the state 1 to the state 2. Besides, if the input of each comparator has been changed one time, the output of at least one of the comparator is pulled up if outputs of both the comparators are 0 (e.g. step 413 in FIG. 4).

Such rules can be applied to other states, such as the steps 415, 417, 419 and 421, until all paths YA0-Y49 are processed. Please note, ideally, the pull down timing should be the same as the timing that the positive input IMP of the first comparator CM_1 is larger than the negative input INM thereof. However, there may be some latency between these two timings. For example, as shown in FIG. 5, the timing of the first one of rising edges of the output A0 is different from the timing of the first one of the falling edges of the output A1, which is the same as the first one of pull downs of the second comparator CM_2.

In the embodiment of FIG. 5, the first state control circuit VC_1 pull downs the output of the first comparator CM_1 or the second comparator CM_2 to improve the hysteresis issue. However, the first state control circuit VC_1 can pull up the output of the first comparator CM_1 or the second comparator CM_2 to improve the hysteresis issue in another embodiment.

Figure 6:
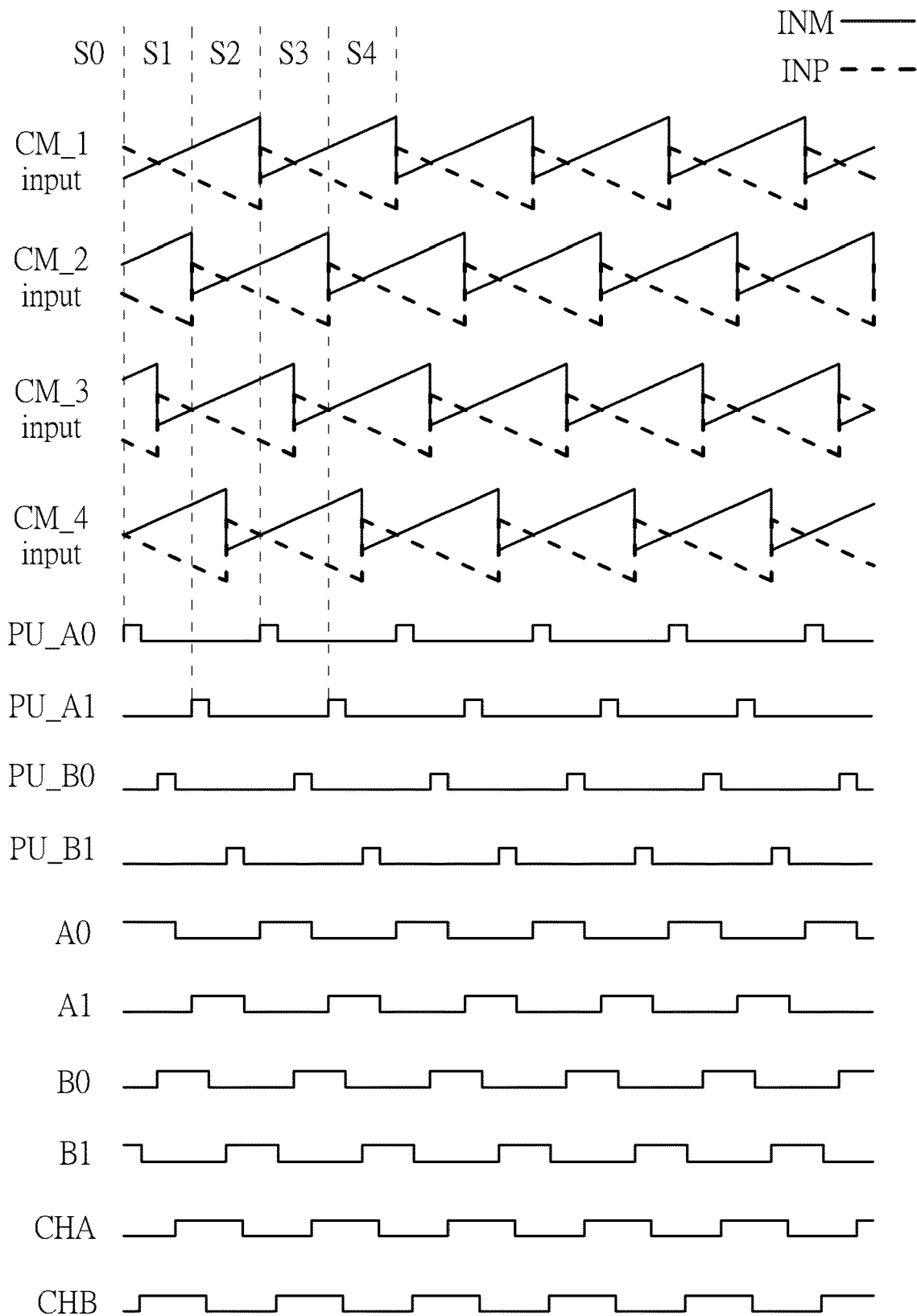

Please refer to FIG. 6, which is a waveform of the interpolation circuit illustrated in FIG. 2, according to another embodiment of the present invention. Some rules of the waveform in FIG. 6 may be opposite to which of FIG. 5, such as: the first multiplexer MUX_1 switches to a next state if the comparing results (e.g. outputs A0, A1, B0, B1) indicate that signal values of the phase shift signals received by positive terminals of the comparators (e.g. INP) are smaller than the signal values of the phase shift signals received by negative terminals of the comparators (e.g. INM). Also, the output of the comparator is pull up when the interpolation circuit 200 switches to a next state and the phase shift signals input to the comparator changes. Besides, if the input of each comparator has changed one time, the output of at least one of the comparator is pulled down if outputs of both the comparators are 1.

Ideally, the pull up timing should be the same as the timing that the positive input IMP of the first comparator CM_1 is smaller than the negative input INM thereof. However, there may be some latency between these two times. For example, as shown in FIG. 6, the timing of the first one of falling edges of the output A0 is different from the timing of the first one of the rising edges of the output A1, which is the same as the first one of pull ups of the second comparator CM_2.

In other words, in the embodiment of FIG. 5, the first voltage level compensating circuit VC_1 pull downs the output A0 to have a logical value 0 when a value of the phase shift signal received by the first positive input terminal of the first comparator CM_1 (INP) changes from a value larger than a value of the phase shift signal received by the first negative input terminal (INM) of the first comparator CM_1 to a value smaller than a value of the phase shift signal received by the first negative input terminal. Further, the first voltage level compensating circuit VC_1 pull ups the output signal A0 to have a logical value 1 when a value of the phase shift signal received by the first positive input terminal of the first comparator CM_1 (INP) changes from a value smaller than a value of the phase shift signal received by the first negative input terminal (INM) to a value larger than a value of the phase shift signal received by the first negative input terminal. Such rules can be applied to the second comparator CM_2, the third comparator CM_3 and the fourth comparator CM_4.

The above-mentioned interpolation circuit can be applied to a motor control circuit. Please refer to FIG. 2 again. In one embodiment, the outputs A0, A1, B0, B1 are respectively input to a first clock generating circuit CG 1 and a second clock generating circuit CG 2, to generate a first clock single CLKA and a second clock signal CLKB. Further, the first clock single CLKA and a second clock signal CLKB are respectively input to the first state control circuit SC_1 and the second state control circuit SC_2, to respectively generate a first control signal CHA and the second control signal CHB. The first control signal CHA and the second control signal CHB can be applied to control a motor, thus can be regarded a first motor control signal and a second motor control signal.

Furthermore, the first control signal CHA and the second control signal CHB correspond to the outputs A0, A1, B0 and B1. For example, in the embodiment of FIG. 5, the rising edges of the first control signal CHA correspond to the rising edges of the output A0, and the falling edges of the first control signal CHA correspond to the rising edges of the output A1. Further, in the embodiment of FIG. 5, the rising edges of the second control signal CHB correspond to the rising edges of the output B1, and the falling edges of the second control signal CHB correspond to the rising edges of the output B0.

Besides, in the embodiment of FIG. 6, the rising edges of the first control signal CHA correspond to the falling edges of the output A0, and the falling edges of the first control signal CHA correspond to the falling edges of the output A1. Additionally, in the embodiment of FIG. 6, the rising edges of the second control signal CHB correspond to the falling edges of the output B1, and the falling edges of the second control signal CHB correspond to the falling edges of the output B0.

Figure 7:
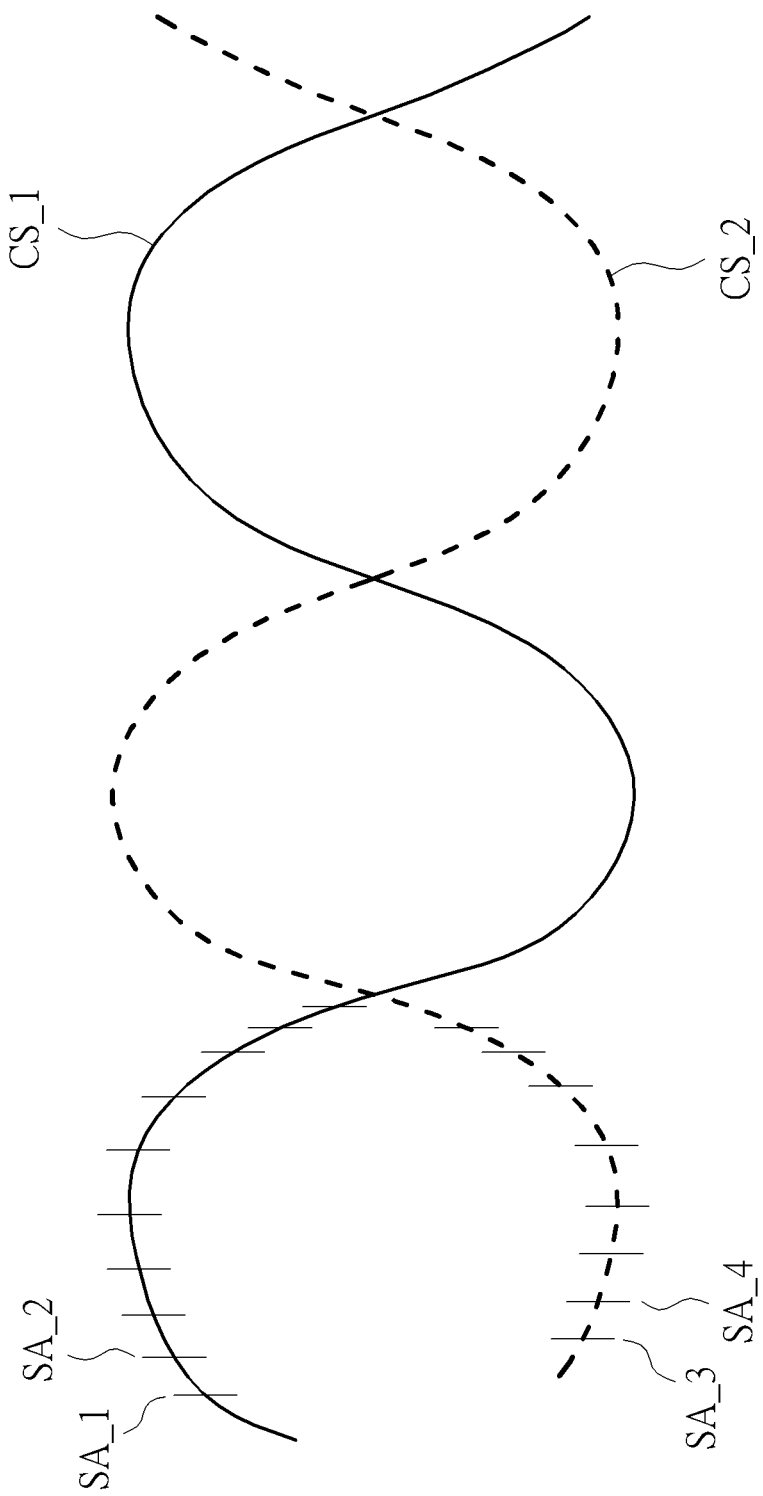
FIG. 7 is a schematic diagram illustrating a situation that the interpolation circuit is applied to a motor driving circuit.

FIG. 7 is a schematic diagram illustrating a situation that the interpolation circuit is applied to a motor driving circuit, according to one embodiment of the present invention. As illustrated in FIG. 7, the control signals CS_1 and CS_2 are input to a motor to control the motor. The control signals CS_1 and CS_2 are sampled at different sampling points to generate phase shift signals $PS\_11 \ldots PS\_1n, PS\_21 \ldots PS\_2m$, and the first control signal CHA, the second control signal CHB are generated accordingly. The first control signal CHA and the second control signal CHB correspond to the sampled values of the control signals CS_1 and CS_2. Therefore, the interpolation circuit in the motor driving circuit provided by the present invention can be applied to sample the control signal input to the motor and accordingly generate the first control signal CHA, the second control signal CHB, which can control the motor, to re-generate the control signals CS_1, CS_2 by interpolating.

In view of above-mentioned embodiments, the output of the comparator can be compensated to improve the hysteresis issue of the comparator, thus the comparing result of the comparator can be more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An interpolation circuit, comprising:
   a phase shift circuit, configured to receive at least one input signal to generate a plurality of phase shift signals of the input signal;
   a first multiplexer configured to receive at least portion of the phase shift signals;
   a first comparator, comprising a first positive input terminal and a first negative input terminal to receive the phase shift signals output by the first multiplexer;
   a second comparator, comprising a second positive input terminal and a second negative input terminal to receive the phase shift signals output by the first multiplexer, wherein the first comparator and the second comparator do not receive identical ones of the phase shift signals simultaneously;

a first state control circuit, configured to control the first multiplexer to switch to a different state according to a first comparing result of the phase shift signals received by the first positive input terminal and the first negative input terminal and a second comparing result of the phase shift signals received by the second positive input terminal and the second negative input terminal, wherein the first multiplexer outputs different ones of the phase shift signals in different states; and a first voltage level compensating circuit, coupled to a first output terminal of the first comparator and a second output terminal of the second comparator, to pull up a first output signal from the first output terminal or a second output signal from the second output terminal when the state of the first multiplexer changes, or to pull down the first output signal or the second output signal when the state of the first multiplexer changes.

2. The interpolation circuit of claim 1, wherein the first state control circuit controls the first multiplexer to switch to the different state, when a value of the phase shift signal at the first positive input terminal is larger than a value of the phase shift signal at the first negative input terminal and a value of the phase shift signal at the second positive input terminal is larger than a value of the phase shift signal at the second positive input terminal.

3. The interpolation circuit of claim 1, wherein the first state control circuit controls the first multiplexer to switch to the different state, when a value of the phase shift signal at the first positive input terminal is lower than a value of the phase shift signal at the first negative input terminal and a value of the phase shift signal at the second positive input terminal is lower than a value of the phase shift signal at the second positive input terminal.

4. The interpolation circuit of claim 1, wherein the output of the first comparator is pull down or pull up when the first multiplexer switches to a next state and the phase shift signals input to the first comparator changes.

5. The interpolation circuit of claim 1, wherein the first voltage level compensating circuit pull downs the first output signal to have a logical value 0 when a value of the phase shift signal received by the first positive input terminal changes from a value larger than a value of the phase shift signal received by the first negative input terminal to a value smaller than a value of the phase shift signal received by the first negative input terminal.

6. The interpolation circuit of claim 1, wherein the first voltage level compensating circuit pull ups the first output signal to have a logical value 1 when a value of the phase shift signal received by the first positive input terminal changes from a value smaller than a value of the phase shift signal received by the first negative input terminal to a value larger than a value of the phase shift signal received by the first negative input terminal.

7. The interpolation circuit of claim 1, further comprising:

a second multiplexer, configured to receive at least portion of the phase shift signals, wherein the first multiplexer and the second multiplexer receive different ones of the phase shift signals;

a third comparator, comprising a third positive input terminal and a third negative input terminal to receive the phase shift signals output by the second multiplexer;

a fourth comparator, comprising a fourth positive input terminal and a fourth negative input terminal to receive the phase shift signals output by the second multiplexer, wherein the third comparator and the fourth comparator do not receive identical ones of the phase shift signals simultaneously;

a second state control circuit, configured to control the second multiplexer to switch to a different state according to a third comparing result of phase shift signals received by the third positive input terminal and the third negative input terminal and a fourth comparing result of phase shift signals received by the fourth positive input terminal and the fourth negative input terminal, wherein the second multiplexer outputs different ones of the phase shift signals in different states; and a second voltage level compensating circuit, coupled to a third output terminal of the third comparator and a fourth output terminal of the fourth comparator, to pull up a third output signal from the third output terminal or a fourth output signal from the fourth output terminal when the state of the second multiplexer changes, or to pull down the third output signal or the fourth output signal when the state of the second multiplexer changes.

8. The interpolation circuit of claim 7, wherein the first multiplexer receives the phase shift signals having $\sin[(2N\times 1.8°)]$ phase shift from the input signal, and the second multiplexer receives the phase shift signals having $\sin[(2N+1)\times 1.8°]$ phase shift from the input signal, wherein N is 0 or a positive integer.

9. The interpolation circuit of claim 1, wherein the first voltage level compensating circuit is configured to compensate hysteresis effect of the first comparator and the second comparator.

10. A motor driving circuit, comprising:

an interpolation circuit, comprising:

a phase shift circuit, configured to receive at least one input signal to generate a plurality of phase shift signals of the input signal;

a first multiplexer, configured to receive at least portion of the phase shift signals;

a first comparator, comprising a first positive input terminal and a first negative input terminal to receive the phase shift signals output by the first multiplexer;

a second comparator, comprising a second positive input terminal and a second negative input terminal to receive the phase shift signals output by the first multiplexer, wherein the first comparator and the second comparator do not receive identical ones of the phase shift signals simultaneously;

a first state control circuit, configured to control the first multiplexer to switch to a different state according to a first comparing result of the phase shift signals received by the first positive input terminal and the first negative input terminal and a second comparing result of the phase shift signals received by the second positive input terminal and the second negative input terminal, wherein the first multiplexer outputs different ones of the phase shift signals in different states; and a first voltage level compensating circuit, coupled to a first output terminal of the first comparator and a second output terminal of the second comparator, to pull up a first output signal from the first output terminal or a second output signal from the second output terminal when the state of the first multiplexer changes, or to pull down the first output signal or the second output signal when the state of the first multiplexer changes; and a first clock generating circuit, configured to generate a first clock signal according to the first output signal and the second output signal;

wherein the first voltage level compensating circuit further generates a first motor control signal according to the first output signal, the second output signal and the first clock signal.

11. The motor driving circuit of claim 10, wherein the first state control circuit controls the first multiplexer to switch to the different state, when a value of the phase shift signal at the first positive input terminal is larger than a value of the phase shift signal at the first negative input terminal and a value of the phase shift signal at the second positive input terminal is larger than a value of the phase shift signal at the second positive input terminal.

12. The motor driving circuit of claim 10, wherein the first state control circuit controls the first multiplexer to switch to the different state, when a value of the phase shift signal at the first positive input terminal is lower than a value of the phase shift signal at the first negative input terminal and a value of the phase shift signal at the second positive input terminal is lower than a value of the phase shift signal at the second positive input terminal.

13. The motor driving circuit of claim 10, wherein the output of the first comparator is pull down or pull up when the first multiplexer switches to a next state and the phase shift signals input to the first comparator changes.

14. The motor driving circuit of claim 10, wherein the first voltage level compensating circuit pull downs the first output signal to have a logical value 0 when a value of the phase shift signal received by the first positive input terminal changes from a value larger than a value of the phase shift signal received by the first negative input terminal to a value smaller than a value of the phase shift signal received by the first negative input terminal.

15. The motor driving circuit of claim 10, wherein the first voltage level compensating circuit pull ups the first output signal to have a logical value 1 when a value of the phase shift signal received by the first positive input terminal changes from a value smaller than a value of the phase shift signal received by the first negative input terminal to a value larger than a value of the phase shift signal received by the first negative input terminal.

16. The motor driving circuit of claim 15, wherein the interpolation circuit further comprises:

a second clock generating circuit, configured to generate a second clock signal according to the third output signal and the fourth output signal;

wherein the second voltage level compensating circuit further generates a second motor control signal according to the third output signal, the fourth output signal and the second clock signal.

17. The motor driving circuit of claim 10, further comprising:

a second multiplexer, configured to receive at least portion of the phase shift signals, wherein the first multiplexer and the second multiplexer receive different ones of the phase shift signals;

a third comparator, comprising a third positive input terminal and a third negative input terminal to receive the phase shift signals output by the second multiplexer;

a fourth comparator, comprising a fourth positive input terminal and a fourth negative input terminal to receive the phase shift signals output by the second multiplexer, wherein the third comparator and the fourth comparator do not receive identical ones of the phase shift signals simultaneously;

a second state control circuit, configured to control the second multiplexer to switch to a different state according to a third comparing result of phase shift signals received by the third positive input terminal and the third negative input terminal and a fourth comparing result of phase shift signals received by the fourth positive input terminal and the fourth negative input terminal, wherein the second multiplexer outputs different ones of the phase shift signals in different states; and a second voltage level compensating circuit, coupled to a third output terminal of the third comparator and a fourth output terminal of the fourth comparator, to pull up a third output signal from the third output terminal or a fourth output signal from the fourth output terminal when the state of the second multiplexer changes, or to pull down the third output signal or the fourth output signal when the state of the second multiplexer changes.

18. The motor driving circuit of claim 17, wherein the first multiplexer receives the phase shift signals having $\sin(2N\times 1.8°)$ phase shift from the input signal, and the second multiplexer receives the phase shift signals having $\sin[(2N+1)\times1.8°]$ phase shift from the input signal, wherein N is 0 or a positive integer.

19. The motor driving circuit of claim 10, wherein the first voltage level compensating circuit is configured to compensate hysteresis effect of the first comparator and the second comparator.

* * * * *